(12) United States Patent
Protasov et al.

(10) Patent No.: US 9,599,734 B2
(45) Date of Patent: *Mar. 21, 2017

(54) FREQUENCY-DEPENDENT RAY TRACING THROUGH AN INTERFACE

(71) Applicant: WesternGeco L.L.C., Houston, TX (US)

(72) Inventors: Maxim Protasov, Berdsk (RU); Konstantin S. Osypov, Houston, TX (US); David Nichols, Palo Alto, CA (US); Can Evren Yarman, Houston, TX (US)

(73) Assignee: WESTERNGECO L.L.C., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/529,856

(22) Filed: Oct. 31, 2014

(65) Prior Publication Data
US 2015/0055833 A1 Feb. 26, 2015

Related U.S. Application Data

(63) Continuation of application No. 13/434,579, filed on Mar. 29, 2012, now Pat. No. 8,879,798.

(60) Provisional application No. 61/469,925, filed on Mar. 31, 2011.

(51) Int. Cl.
G06T 7/00 (2006.01)
G01V 1/30 (2006.01)
G01V 1/28 (2006.01)

(52) U.S. Cl.
CPC ............ G01V 1/301 (2013.01); G01V 1/28 (2013.01); G01V 1/303 (2013.01); G01V 2210/671 (2013.01)

(58) Field of Classification Search
CPC . G01V 1/28; G01V 1/30; G01V 1/301; G01V 1/305; G01V 1/306; G01V 2210/671; G06T 7/00
See application file for complete search history.

(56) References Cited

U.S. PATENT DOCUMENTS

| 4,878,205 A | 10/1989 | Gelchinsky |
| 6,681,185 B1 * | 1/2004 | Young ................ G01V 1/30 367/38 |
| 6,691,075 B1 | 2/2004 | Winbow et al. |
| 6,763,305 B2 | 7/2004 | Bernitsas |
| 6,778,907 B1 | 8/2004 | Washbourne et al. |
| 7,095,678 B2 | 8/2006 | Winbow et al. |
| 7,447,114 B2 | 11/2008 | DuBose, Jr. |

(Continued)

OTHER PUBLICATIONS

Lytle et al. "Iterative Ray Tracing Between Boreholes for Underground Image Reconstruction." IEEE Transactions on Geoscience and Remote Sensing, vol. GE-18, No. 3, Jul. 1980, pp. 234-240.*

(Continued)

*Primary Examiner* — Jon Chang

(57) ABSTRACT

Computing systems and methods for improving processing of collected data are disclosed. In one embodiment, while ray-tracing through a sub-surface region, a frequency-dependent outgoing ray direction is computed from a point on an interface disposed in the sub-surface region when the ray tracing is at the interface.

13 Claims, 11 Drawing Sheets

(56) References Cited

U.S. PATENT DOCUMENTS

| | | | |
|---|---|---|---|
| 8,879,798 B2* | 11/2014 | Protasov | G01V 1/28 382/109 |
| 2002/0128779 A1* | 9/2002 | Kerekes | G01V 1/301 702/14 |
| 2003/0208321 A1 | 11/2003 | Martinez et al. | |
| 2004/0117123 A1 | 6/2004 | Jing | |
| 2004/0122594 A1 | 6/2004 | Matsuoka et al. | |
| 2011/0166840 A1 | 7/2011 | Green et al. | |
| 2012/0010820 A1 | 1/2012 | Winbow et al. | |

OTHER PUBLICATIONS

Sato et al. "An Imaging Algorithm of Objects Embedded in a Lossy-Dispersive Medium for Subsurface Radar-Data Processing." IEEE Transactions on Geoscience and Remote Sensing, vol. 38, No. 1, Jan. 2000, pp. 296-303.*

Goloshubin et al. "Frequency-dependent Seismic Reflection from a Permeable Boundary in a Fractured Reservoir" SEG/New Orleans, 2006, pp. 1742-1746.*

International Search Report and Written Opinion of PCT Application No. PCT/US2012/031378 dated Nov. 1, 2012: pp. 1-8.

Foreman, T.L., "A Frequency-Dependent Ray Theory", Ph. D. Thesis, (1987) pp. 1-97.

Biondi, B., "Solving the Frequency-Dependent Eikonal Equation", SEG expended abstracts (1992) pp. 1315-1319.

Cerveny, V. and Soares, J.E.P., "Fresnel volume ray tracing", Geophysics,vol. 57, No. 7, (1992) pp. 902-915.

Chapman, C., "Fundamentals of Seismic Wave Propagation", Cambridge university press (2004) pp. 532-550.

Hobro, J.W.D., "Direct Representation of Complex, High-contrast Velocity Features in Kirchhoff PreSDM Velocity Models", EAGE expended abstracts (2008) 5 pages.

Lomax, A., "The wavelength-smoothing method for approximating broad-band wave propagation through complicated velocity structures," Geophysical Journal International, 117, ( 1994) pp. 313-334.

Lomax, A., and R. Snieder, "Estimation of finite-frequency waveforms through wavelength-dependent averaging of velocity", Geophysical Journal International, 126 (1996) pp. 369-381.

EP Application No. 12763922.7, Supplementary European Search Report, dated Oct. 15, 2015, pp. 7.

Zeroug, "Corrections to complex ray tracing for modeling ultrasonic beam interaction with single interfaces when the reflection/transmission coefficient vanishes." IEEE Ultrasonics Symposium, vol. 1, Oct. 2000, pp. 831-834.

Remley, "Improving the Accuracy of Ray-Tracing Techniques for Indoor Propagation Modeling." IEEE Transactions to Vehicular Technology, vol. 49, No. 6, Nov. 2000, pp. 2350-2358.

International Preliminary Report on Patentabiiity issued in the related PCT application PCT/US2012/031378, dated Oct. 1, 2013 (4 pages).

* cited by examiner

400

- Compute a Fresnel volume for a trial outgoing direction within the vicinity of a point of interest. — 402
- Compute an intersection of the Fresnel volume with an interface within the vicinity of the point of interest. — 404
- Compute an approximation to a Green's function within the intersection of the Fresnel volume with the interface within the vicinity of the point of interest. — 406
- Compute the Kirchhoff-like integral based cost function using the approximation of the Green's function. — 408
- Vary the trial outgoing direction until the cost function is maximized. — 410

| Compute a Fresnel volume within the vicinity of a point of interest that is independent of outgoing direction. | ⟋ 502 |

↓

| Compute the intersection of the Fresnel volume with the interface within the vicinity of the point of interest. | ⟋ 504 |

↓

| Compute an approximation to a Green's function within the intersection of the Fresnel volume with the interface within the vicinity of the point of interest. | ⟋ 506 |

↓

| Using the approximation of the Green's function to compute at one or more points within the intersection: an incoming direction, a surface normal and a contribution to the Kirchhoff-like integral based cost function. | ⟋ 508 |

↓

| For a point of interest, compute: an effective incoming direction as a weighted sum of incoming direction of the point; an effective normal as a weighted sum of the point; an effective boundary location as a weighted sum of the point. | ⟋ 510 |

↓

| Apply Snell's law to the effective incoming direction and the effective normal to compute an effective outgoing direction. | ⟋ 512 |

↓

| Use the effective boundary location to compute an effective travel time correction. | ⟋ 514 |

- While performing ray tracing through a sub-surface region that includes an interface: — 602
  - When the ray tracing is before the interface, perform conventional ray tracing through the sub-surface region. — 604
  - When the ray tracing is at the interface: compute a frequency-dependent outgoing ray direction from a point on the interface, wherein the computation is based at least in part an incoming ray direction, one or more surface normals, and a computed boundary integral that is based at least in part on the incoming ray direction and a frequency parameter. — 606
    - Use the computed boundary integral as a cost function to find the frequency-dependent outgoing ray direction. — 608
    - The computation of the frequency-dependent outgoing ray direction is also based on a travel time from an edge of the sub-surface region to the point of interest. — 610
    - The incoming ray direction is a weighted average of a plurality of incoming directions corresponding to a propagating wave. — 612
    - The computation of the frequency-dependent outgoing ray direction includes localization of a Kirchoff integral corresponding to a region of a Fresnel volume corresponding to the vicinity of the point of interest. — 614
  - Compute an outgoing traveltime from the point on the interface. — 616
  - Compute an outgoing amplitude from the point on the interface. — 618
  - Use the boundary integral to find one or more local averaging properties substantially within the vicinity of the point on the interface. — 620
  - When the ray tracing is after the interface, perform conventional ray tracing through the sub-surface region. — 622
- Form an image of the sub-surface region based at least in part on the ray-tracing. — 624

Compute a frequency-dependent outgoing ray direction departing from a point at an interface disposed in a sub-surface region, wherein the computation is based at least in part on an incoming ray direction, one or more surface normals, and a computed boundary integral that is based at least in part on the incoming ray direction and a frequency parameter. ⟋702

The sub-surface region is a subterranean region with one or more geologic regions of interest. ⟋704

Form an image of the sub-surface region based at least in part on the frequency-dependent outgoing ray direction. ⟋706

Figure 7

FREQUENCY-DEPENDENT RAY TRACING THROUGH AN INTERFACE

CROSS-REFERENCE TO RELATED APPLICATION

This application is a continuation of U.S. patent application Ser. No. 13/434,579, filed Mar. 29, 2012, and titled FREQUENCY-DEPENDENT RAY TRACING THROUGH AN INTERFACE, which claims priority to and benefit under 35 U.S.C. §119(e) of U. S. Provisional Patent Application Ser. No. 61/469,925 and filed Mar. 31, 2011. Each of the aforementioned related patent applications is herein incorporated by reference.

TECHNICAL FIELD

The embodiments of methods and computing systems discussed herein are related to processing of collected data, and some embodiments are more particularly related to data processing for imaging collected data corresponding to a sub-surface region.

BACKGROUND

Ray tracing is a popular seismic data processing method for approximating wave propagation for small wavelengths, or, equivalently, high frequencies. Furthermore, ray tracing results are still valid when medium parameters and the wavefields are smooth on the scale-length of the width of the Fresnel volume. In some instances, conventional ray-tracing validity conditions can break down in the vicinity of an interface when there is high contrast between the two sides of the interface and/or when the interface has a complex structure. One example of this concern is with respect to velocity models that include salt with rugose boundaries that are used in Kirchhoff prestack depth migration. In practice, model smoothing in one of its various forms can be used to stabilize geometric ray results.

Alternatively, finite-difference methods propagate band-limited waves, without requiring smoothness constraints on the medium parameters. But they are computationally demanding.

Accordingly, there is a need for methods and computing systems that can employ more effective and accurate methods for data processing of collected data that corresponds to a sub-surface region, including techniques that allow capturing a band-limited wave propagation property of finite-difference methods by employing frequency-dependent ray-tracing.

SUMMARY

The computing systems, methods, processing procedures, techniques and workflows disclosed herein are more efficient and/or effective methods for data processing of collected data that corresponds to a sub-surface region.

In accordance with some embodiments, a method for ray tracing through a sub-surface region that includes an interface is performed that includes: when the ray tracing is before the interface, performing conventional ray tracing through the sub-surface region; when the ray tracing is at the interface, computing a frequency-dependent outgoing ray direction from a point on the interface, wherein the computation is based at least in part on: an incoming ray direction, one or more surface normals, and a computed boundary integral that is based at least in part on the incoming ray direction and a frequency parameter.

In accordance with some embodiments, a computing system for ray tracing through a sub-surface region that includes an interface is provided that includes at least one processor, at least one memory, and one or more programs stored in the at least one memory, wherein the one or more programs are configured to be executed by the one or more processors, the one or more programs including instructions for: when the ray tracing is before the interface, performing conventional ray tracing through the sub-surface region; when the ray tracing is at the interface, computing a frequency-dependent outgoing ray direction from a point on the interface, wherein the computation is based at least in part on: an incoming ray direction, one or more surface normals, and a computed boundary integral that is based at least in part on the incoming ray direction and a frequency parameter.

In accordance with some embodiments, a computer readable storage medium for ray tracing through a sub-surface region that includes an interface is provided, the medium having a set of one or more programs including instructions that when executed by a computing system cause the computing system to: when the ray tracing is before the interface, perform conventional ray tracing through the sub-surface region; when the ray tracing is at the interface, compute a frequency-dependent outgoing ray direction from a point on the interface, wherein the computation is based at least in part on: an incoming ray direction, one or more surface normals, and a computed boundary integral that is based at least in part on the incoming ray direction and a frequency parameter.

In accordance with some embodiments, a computing system for ray tracing through a sub-surface region that includes an interface is provided that includes at least one processor, at least one memory, and one or more programs stored in the at least one memory; and when the ray tracing is before the interface, means for performing conventional ray tracing through the sub-surface region; when the ray tracing is at the interface, means for computing a frequency-dependent outgoing ray direction from a point on the interface, wherein the computation is based at least in part on: an incoming ray direction, one or more surface normals, and a computed boundary integral that is based at least in part on the incoming ray direction and a frequency parameter.

In accordance with some embodiments, an information processing apparatus for use in a computing system is provided for ray tracing through a sub-surface region that includes an interface, and includes the following: when the ray tracing is before the interface, means for performing conventional ray tracing through the sub-surface region; when the ray tracing is at the interface, means for computing a frequency-dependent outgoing ray direction from a point on the interface, wherein the computation is based at least in part on: an incoming ray direction, one or more surface normals, and a computed boundary integral that is based at least in part on the incoming ray direction and a frequency parameter.

In accordance with some embodiments, a method for ray tracing through a sub-surface region that includes an interface is performed that includes: computing a frequency-dependent outgoing ray direction from a point on the interface when the ray tracing is at the interface, wherein the computation is based at least in part on: an incoming ray direction, one or more surface normals, and a computed boundary integral that is based at least in part on the incoming ray direction and a frequency parameter.

In accordance with some embodiments, a computing system for ray tracing through a sub-surface region that includes an interface is provided that includes at least one processor, at least one memory, and one or more programs stored in the at least one memory, wherein the one or more programs are configured to be executed by the one or more processors, the one or more programs including instructions for: computing a frequency-dependent outgoing ray direction from a point on the interface when the ray tracing is at the interface, wherein the computation is based at least in part on: an incoming ray direction, one or more surface normals, and a computed boundary integral that is based at least in part on the incoming ray direction and a frequency parameter.

In accordance with some embodiments, a computer readable storage medium for ray tracing through a sub-surface region that includes an interface is provided, the medium having a set of one or more programs including instructions that when executed by a computing system cause the computing system to: compute a frequency-dependent outgoing ray direction from a point on the interface when the ray tracing is at the interface, wherein the computation is based at least in part on: an incoming ray direction, one or more surface normals, and a computed boundary integral that is based at least in part on the incoming ray direction and a frequency parameter In accordance with some embodiments, a computing system for ray tracing through a sub-surface region that includes an interface is provided that includes at least one processor, at least one memory, and one or more programs stored in the at least one memory; and means for computing a frequency-dependent outgoing ray direction from a point on the interface when the ray tracing is at the interface, wherein the computation is based at least in part on: an incoming ray direction, one or more surface normals, and a computed boundary integral that is based at least in part on the incoming ray direction and a frequency parameter.

In accordance with some embodiments, an information processing apparatus for use in a computing system is provided for ray tracing through a sub-surface region that includes an interface, and includes means for computing a frequency-dependent outgoing ray direction from a point on the interface when the ray tracing is at the interface, wherein the computation is based at least in part on: an incoming ray direction, one or more surface normals, and a computed boundary integral that is based at least in part on the incoming ray direction and a frequency parameter.

In accordance with some embodiments, a method is performed that includes: computing a frequency-dependent outgoing ray direction departing from a point at an interface disposed in a sub-surface region, wherein the computation is based at least in part on an incoming ray direction, one or more surface normals, and a computed boundary integral that is based at least in part on the incoming ray direction and a frequency parameter.

In accordance with some embodiments, a computing system is provided that includes at least one processor, at least one memory, and one or more programs stored in the at least one memory, wherein the one or more programs are configured to be executed by the one or more processors, the one or more programs including instructions for computing a frequency-dependent outgoing ray direction departing from a point at an interface disposed in a sub-surface region, wherein the computation is based at least in part on an incoming ray direction, one or more surface normals, and a computed boundary integral that is based at least in part on the incoming ray direction and a frequency parameter.

In accordance with some embodiments, a computer readable storage medium is provided, the medium having a set of one or more programs including instructions that when executed by a computing system cause the computing system to: compute a frequency-dependent outgoing ray direction departing from a point at an interface disposed in a sub-surface region, wherein the computation is based at least in part on an incoming ray direction, one or more surface normals, and a computed boundary integral that is based at least in part on the incoming ray direction and a frequency parameter.

In accordance with some embodiments, a computing system is provided that includes at least one processor, at least one memory, and one or more programs stored in the at least one memory; and means for computing a frequency-dependent outgoing ray direction departing from a point at an interface disposed in a sub-surface region, wherein the computation is based at least in part on an incoming ray direction, one or more surface normals, and a computed boundary integral that is based at least in part on the incoming ray direction and a frequency parameter.

In accordance with some embodiments, an information processing apparatus for use in a computing system is provided, and includes means for computing a frequency-dependent outgoing ray direction departing from a point at an interface disposed in a sub-surface region, wherein the computation is based at least in part on an incoming ray direction, one or more surface normals, and a computed boundary integral that is based at least in part on the incoming ray direction and a frequency parameter.

In some embodiments, an aspect of the invention involves computing an outgoing traveltime from the point on the interface.

In some embodiments, an aspect of the invention involves computing an outgoing amplitude from the point on the interface.

In some embodiments, an aspect of the invention involves using the computed boundary integral as a cost function to find the frequency-dependent outgoing ray direction.

In some embodiments, an aspect of the invention involves computing a Fresnel volume for a trial outgoing direction within the vicinity of the point on the interface; computing an intersection of the Fresnel volume with the interface within the vicinity of the point on the interface; computing an approximation of a Green's function within the intersection of the Fresnel volume with the interface within the vicinity of the point on the interface; computing a Kirchhoff-like integral based cost function within the intersection of the Fresnel volume with the interface within the vicinity of the point on the interface using the approximated Green's function; and varying the trial outgoing direction until the cost function is maximized (or in some embodiments, until the cost function is increased).

In some embodiments, an aspect of the invention involves using the boundary integral to find one or more local averaging properties substantially within the vicinity of the point on the interface.

In some embodiments, an aspect of the invention involves computing a Fresnel volume for a fixed outgoing direction within the vicinity of the point on the interface; computing the intersection of the Fresnel volume with the interface within the vicinity of the point on the interface; computing an approximation to a Green's function for a plurality of points within the intersection of the Fresnel volume with the interface within the vicinity of the point on the interface; at respective points in the plurality of points, using the approximated Green's function to compute respective incoming directions, respective surface normals and their respective contributions to a cost function; for the point on the interface, computing: an effective incoming direction as a weighted sum of the respective incoming directions of the plurality of points, and an effective normal as a weighted sum of the respective normals of the plurality of points; and applying Snell's law to the effective incoming direction and effective normal to compute an effective outgoing direction as the outgoing direction.

In some embodiments, an aspect of the invention involves performing conventional ray tracing through the sub-surface region when the ray tracing is after the interface.

In some embodiments, an aspect of the invention involves forming an image of the sub-surface region based at least in part on the ray-tracing.

In some embodiments, an aspect of the invention includes that the computation of the frequency-dependent outgoing ray direction is also based on a travel time from an edge of the sub-surface region to the point of interest.

In some embodiments, an aspect of the invention includes that the incoming ray direction is a weighted average of a plurality of incoming directions corresponding to a propagating wave.

In some embodiments, an aspect of the invention includes that the computation of the frequency-dependent outgoing ray direction includes localization of a Kirchhoff integral corresponding to a region of a Fresnel volume corresponding to the vicinity of the point of interest.

In some embodiments, an aspect of the invention involves forming an image of the sub-surface region based at least in part on the frequency-dependent outgoing ray direction.

In some embodiments, an aspect of the invention includes that the sub-surface region is a subterranean region with one or more geologic regions of interest.

Thus, the computing systems, methods, processing procedures, techniques, and workflows disclosed herein are more efficient and/or effective methods for data processing of collected data that corresponds to a sub-surface region. These computing systems and methods increase data processing effectiveness, efficiency, and accuracy. Such methods and computing systems may complement or replace conventional methods for processing of collected data that corresponds to a sub-surface region.

BRIEF DESCRIPTION OF THE DRAWINGS

A better understanding of the computing systems, methods, processing procedures, techniques, and workflows disclosed herein can be had when the following detailed description is considered in conjunction with the following drawings, in which:

FIGS. 4-7 are flow diagrams illustrating processing methods in accordance with some embodiments.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components and systems have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 1:
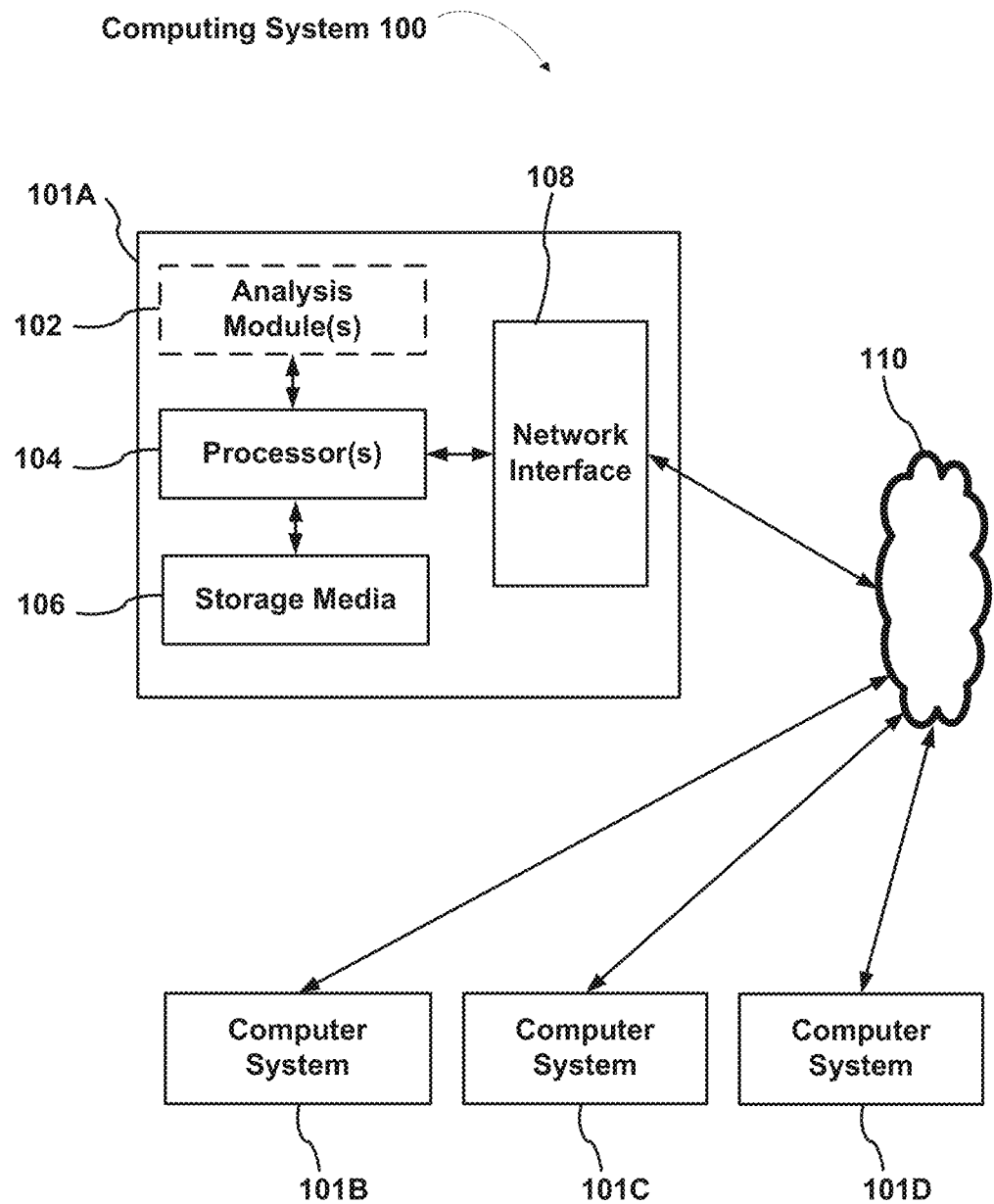
FIG. 1 illustrates a computing system in accordance with some embodiments.

Attention is now directed to FIG. 1, which depicts an example computing system 100 in accordance with some embodiments. The computing system 100 can be an individual computer system 101A or an arrangement of distributed computer systems. The computer system 101A includes one or more analysis modules 102 that are configured to perform various tasks according to some embodiments, such as the methods illustrated in FIGS. 4, 5, 6 and 7. To perform these various tasks, analysis module 102 executes independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, while in communication with one or more computer systems such as 101C and/or 101D that are located in one or more data centers on shore, other ships, and/or located in varying countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the example embodiment of FIG. 1 storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 1, and/or computing system 100 may have a different configuration or arrangement of the components depicted in FIG. 1. The various components shown in FIG. 1 may be implemented in hardware, software, or a combination of both hardware and software, including one or more signal processing and/or application specific integrated circuits.

Attention is now directed to aspects of ray tracing, Snell's law, and the effects of an interface on ray tracing in accordance with some embodiments. FIGS. 2A-2E and FIGS. 3A-3C will be used in conjunction with this disclosure to illustrate and explain various aspects of one or more embodiments disclosed herein.

Figure 2A:
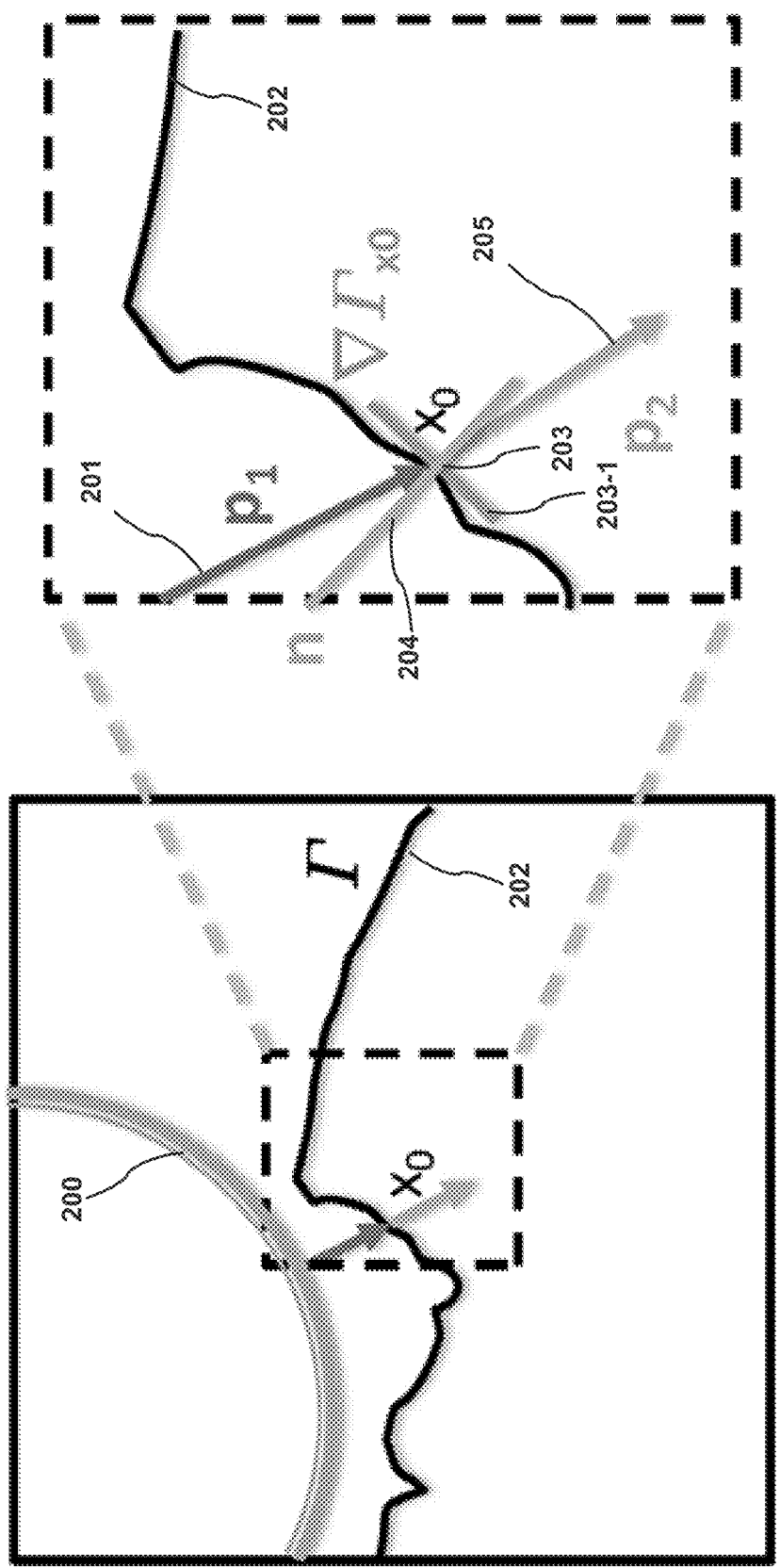
FIGS. 2A-2E and FIGS. 3A-3C illustrate aspects of ray tracing, Snell's law, and the effects of an interface on ray tracing in accordance with some embodiments.
Figure 2B:
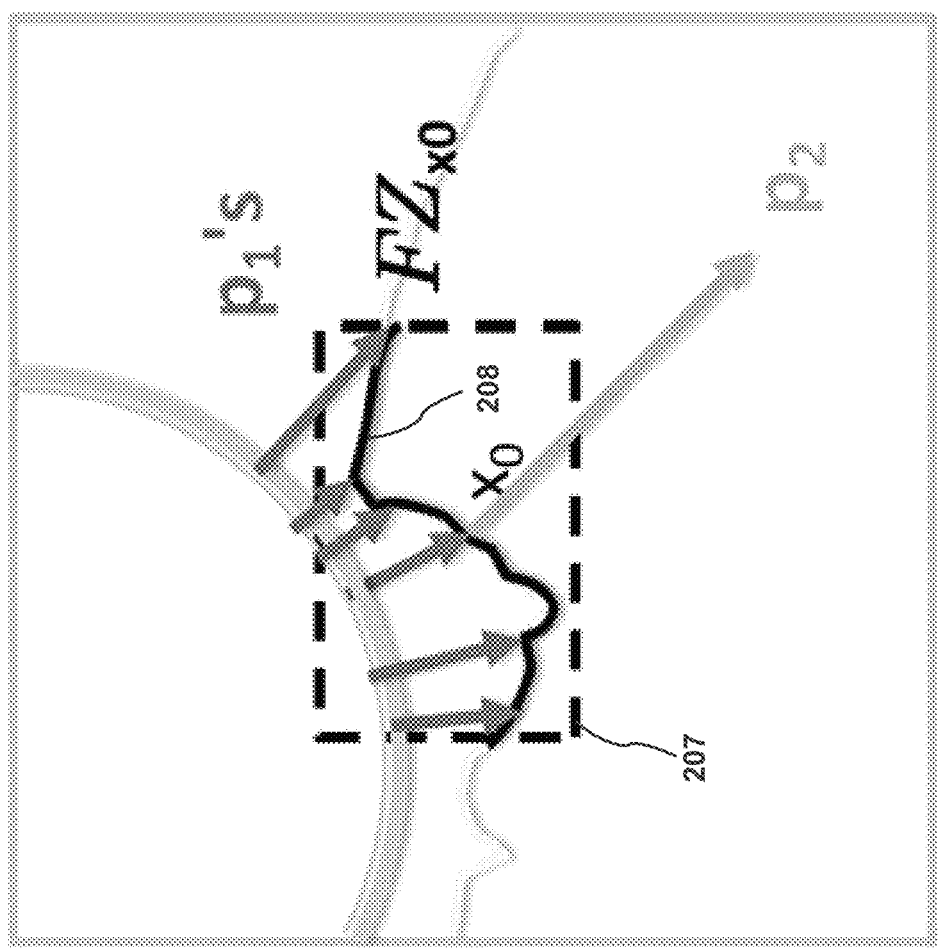
Figure 2C:
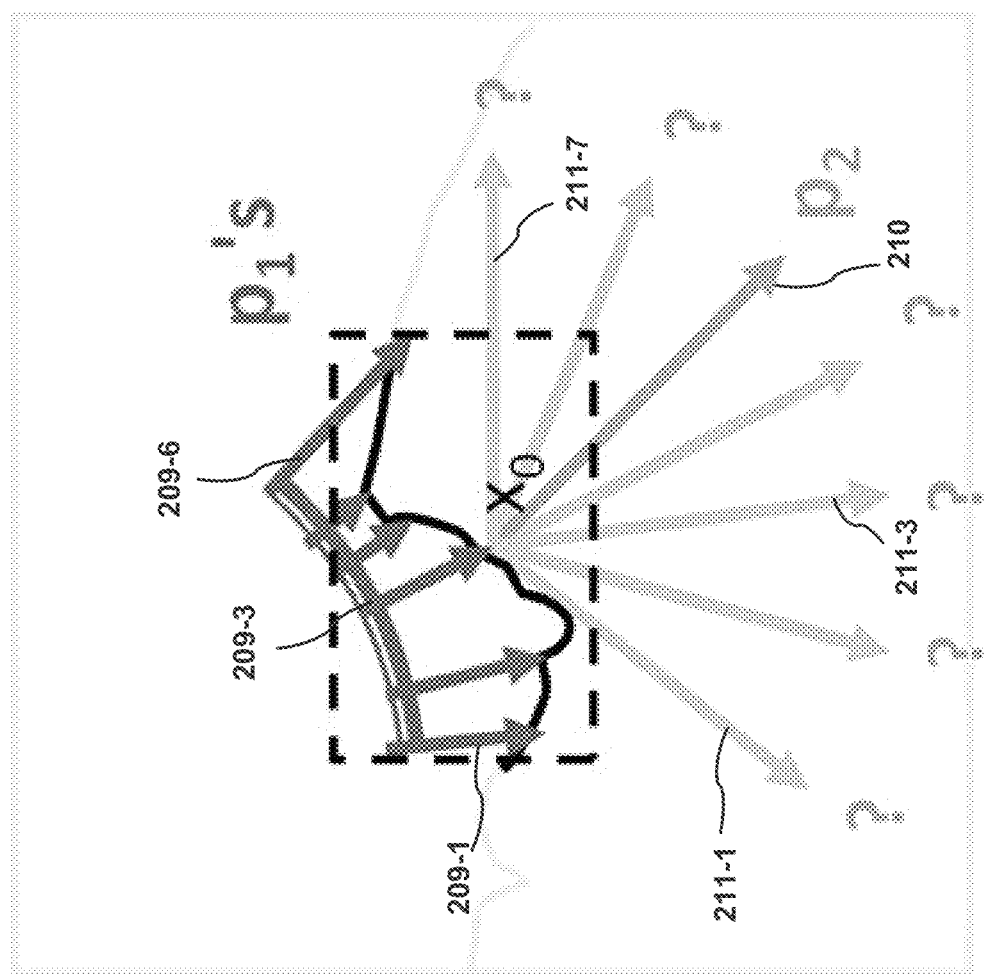

When signal bandwidth is large (e.g., practically unlimited) or when the boundaries of sub-surface structures are smooth, then conventional ray tracing is an efficient way of approximating a wave propagation. In some circumstances, a single ray may adequately describe the wave propagation. The behavior of a wave around an interface, as described by a ray, is characterized by Snell's law, as illustrated by FIG. 2A. An incoming ray (201) with an incoming direction $p_1$ hits the interface Γ (202) at location $x_0$ (203) and normal n (204) crosses through the interface towards an outgoing direction $p_2$ (205). Snell's law dictates the relationship that a singular incoming ray generates a unique outgoing ray under the infinite frequency or bandwidth assumption. For complex, non-flat or rugose interfaces, however, band-limited wave propagation behavior is not adequately characterized using such a high frequency assumption. As illustrated in FIG. 2B, one needs to consider more than one incoming direction within the intersection of a Fresnel volume 207 and an interface, $FZ_{x_0}$ (208), that is within the Fresnel volume 207. In these circumstances, a frequency-dependent ray-tracing method in accordance with some embodiments can be defined using a frequency-dependent Snell's law, which provides that in some circumstances, there is a relationship between the incoming directions that are incident to $Γ_{x_0}$ and the most energetic outgoing direction. As illustrated in FIG. 2C, there are a plurality of incoming directions $p_1$ (209-1 through 209-6, not all labeled in FIG. 2C) that are incident to $Γ_{x_0}$, and there is an energetic outgoing direction 210 among a plurality of outgoing directions $p_2$ (211-1 through 211-7, not all labeled in FIG. 2C).

In this application, some methods and computing systems for performing frequency-dependent ray-tracing in the presence of sharp discontinuities across non-flat or rugose interfaces are presented. In some use cases, such as when performing ray tracing at a particularly steep interface, ray theory may break down, but there is still physical ray propagation where these rays are not high frequency rays and/or these rays depend on frequencies. In some embodiments disclosed herein, methods and computing systems for performing frequency-dependent ray-tracing are based on the usage of boundary integrals, which can improve frequency-dependent ray-tracing at (or substantially adjacent to) the interface where conventional ray tracing may provide less accurate results.

Localization of Kirchhoff Integral

Figure 2D:
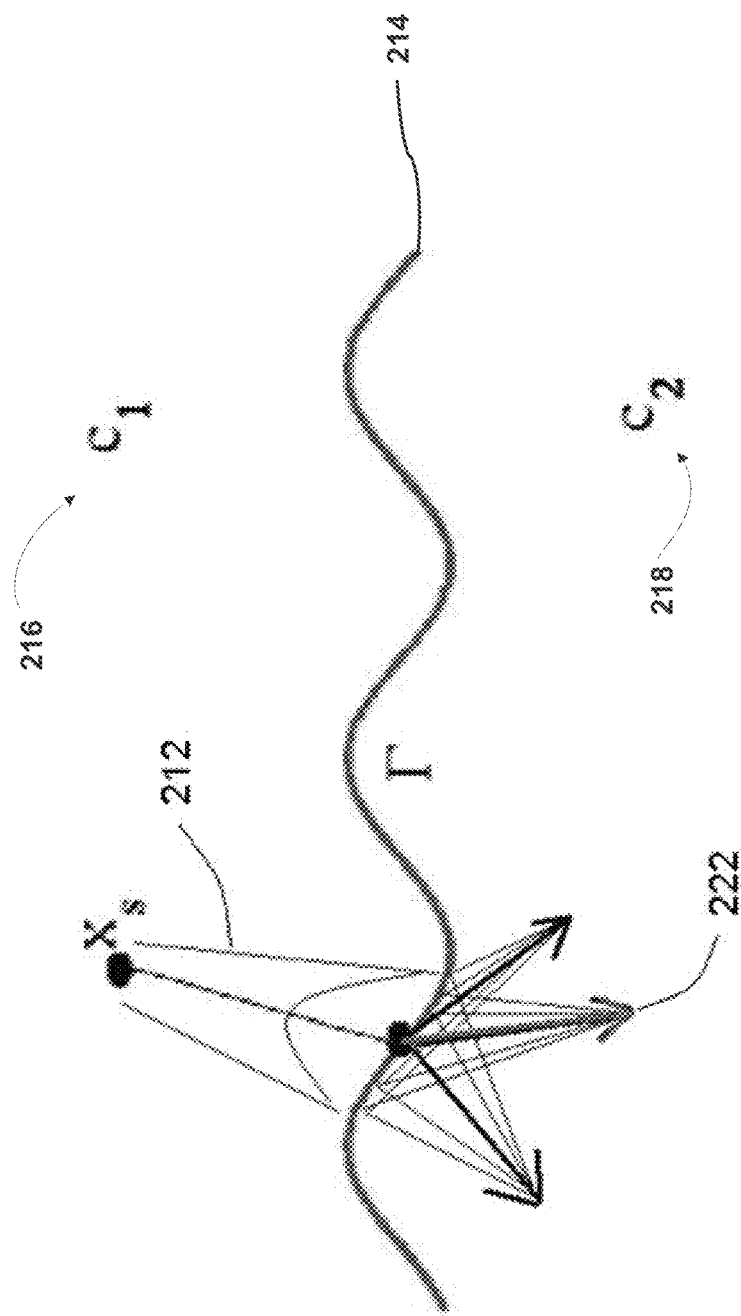

Referring to FIG. 2D, let Γ be the interface (214) between two mediums $C_1$ and $C_2$ (216 and 218, respectively), not necessarily homogeneous, whose Green's functions are denoted by $G_{1,2}$. The source $X_s$ is frequency band-limited (e.g. in some circumstances, it may be a Gaussian beam 212 as depicted in FIG. 2). The transmitted wavefield into the second medium $C_2$ due to a source $X_s$ wavefield in the first medium $C_1$ may be given by the Kirchhoff integral formula as follows:

$$u_T(s,r,t) = \iint_Γ [G_2(x,r,\omega)\partial_n u_I(s,x,\omega) - u_I(s,x,\omega)\partial_n G_2(x,r,\omega)]T(x)e^{-i2\pi\omega t}ds_Γ(x)d\omega, \quad (1)$$

where n is the unit normal of the surface, $\partial_n = n \cdot \nabla_x$ is the directional derivative along the normal, s and r denote source and receiver locations, x is a point on the surface Γ, $u_I$ is the incident wavefield on the interface given by $$u_I(s,x,\omega) = G_1(s,x,\omega)F(\omega), \quad (2)$$

where F(ω) is the source waveform and T(x) is the transmission coefficient at x.

F(ω) is the Fourier transform of a band-limited real waveform, i.e., $F(\omega)=F^*(-\omega)$, and F(ω) is zero outside of the interval $[\omega_{min}, \omega_{max}]$, for some maximum and minimum frequencies $\omega_{max}, \omega_{min}$ respectively. Without loss of generality, we take F(ω) equal to one for $0 \leq \omega_{min} \leq \omega \leq \omega_{max}$ and zero otherwise.

In some embodiments, one can use ray theory/geometric optics approximations of the Green's functions and write $$G_{1,2}(x,y,\omega) \approx A_{1,2}(x,y)e^{i2\pi\omega\tau_{1,2}(x,y)}, \quad (3)$$

where $A_{1,2}(x,y)$ and $\tau_{1,2}(x,y)$ are the amplitude and the traveltime respectively. Assuming that the traveltimes are real values and do not change within the close vicinity of the interface, we simplify Eq. (1) as:

$$u_T(s,r,t) \approx 4\int_Γ A(x,s,r)T(x)\cos(2\pi\omega_c[\tau(x,s,r)-t]) \times \text{sinc}(2\pi\omega_n[\tau(x,s,r)-t])ds_Γ(x), \quad (4)$$

where $\omega_c=(\omega_{min}+\omega_{max})/2$, $\omega_h=(\omega_{max}-\omega_{min})/2$ are referred as central frequency and bandwidth, respectively, $$A(x,s,r)=A_2(x,r)\partial_n A_1(s,x)-A_1(s,x)\partial_n A_2(x,r),$$

$$\tau_{1,2}(x,s,r)=\tau_1(s,x)+\tau_2(x,r), \text{ and}$$

$$\text{sinc}(t)=\sin(t)/t.$$

Although we assumed real traveltimes in this example, these techniques can be extended to complex-valued traveltimes.

Because $\omega_h \leq \omega_c$, the main lobe of $\text{sinc}(2\pi\omega_h t)$ is always wider than that of $\cos(2\pi\omega_c t)$. Thus, we approximate an integral in Eq. (4) by restricting the domain of integration to the main lobe of the cosine function. Because the first zero crossings of the cosine function are at $\pi/2$ and $-\pi/2$, the points x that lie within the main lobe of the cosine function should satisfy $$|\tau(x,s,r)-t| \leq \frac{1}{4\omega_C}. \tag{5}$$

Condition Eq. (5) defines the first Fresnel zone for wavelength $1/(2\omega_c)$ and, hence, the wave path around the ray that connect s to $x_0$ and $x_0$ to r.

For the sake of simplicity, we will assume $\omega_h=\omega_c=B/2$ and use FZ(t), which we refer to as the first Fresnel zone, to denote the points that are on the interface and satisfy condition Eq (5):

$$FZ(t) = \left\{ x \in \Gamma \text{ s.t. } |\tau(x,s,r)-t| \leq \frac{1}{2B} \right\}. \tag{6}$$

We localize the Kirchhoff integral around $x_0$ by means of the first Frensel zone. In this regard, let us define a localization of the Kirchhoff integral $u(s, r, x_0)$ by $u_T(s, r, \tau(x_0, s, r))$:

$$u(s,r,x_0) \approx 4\int FZ_{x_0} A(x,s,r)T(x)\text{sinc}(2\pi B\Delta\tau(x,x_0,s,r))dx \tag{7}$$

where $FZ_{x_0}=FZ(\tau(x_0, s, r))$ with $\Delta\tau(x, x_0, s, r)=\tau(x, s, r)-\tau(x_0, s, r)$.

We approximate $\tau(x_0, s, r)$ with paraxial approximation and write:

$$\Delta\tau(x,x_0,s,r) \approx \left[\frac{p_1(x)}{c_1(x_0)} - \frac{p_2(x)}{c_2(x_0)}\right] \cdot (x-x_0) \tag{8}$$

where $p_{1,2}(x_n)=p_{1,2}(x_0)+\frac{1}{2} M_{1,2}(x_0)(x_n-x_0)$. We refer $p_1(x)$ and $p_2(x)$ as the incoming and outgoing ray directions at x, respectively, and $M_{1,2}(x_0)$ are the second time derivative operators. Substituting the approximations in Eq. (8) into Eq. (7), we replaced the dependency of the localized Kirchhoff integral $u(s, r, x_0)$ on the receiver location with the dependency on the outgoing direction $p_2(x_0)$ and $M_2(x_0)$. As in the example of FIG. 2D, the outgoing direction 222 is $p_2(x_0)$.

Snell's Law and Frequency-Dependent Snell's Law

As shown in FIG. 2A, for Snell's law, for a ray 201 or a wave 200 with unlimited bandwidth, at a location $x_0$ (203) on an interface $\Gamma$ (202) with a tangent plane $\nabla\Gamma_{x_0}$ (203-1) and normal n (204), there is an incoming ray direction $p_1(x_0)$ (shown as 201 in FIG. 2A) and an unique outgoing ray direction $p_2(x_0)$ (shown as 205 in FIG. 2A). For band-limited, frequency-dependent wave propagation, Snell's law can fail or be inaccurate, but we can establish a frequency-dependent relationship in the form of Snell's law as illustrated shown in FIG. 2B.

The frequency-dependent Snell's law is defined as the relationship between the incoming ray direction $p_1(x_0)$ and the outgoing ray direction $p_2(x_0)$ that maximizes (or in some cases, enhances) the amplitude of the localized Kirchhoff integral $u(s, r, x_0)$:

$$\max_{p_2}|u(s,r,x_0)| = \max_{p_2} u(s,r,x_0). \tag{9}$$

where $\|p_2\|^2=1$. We present an illustration of a frequency-dependent Snell's law relationship in FIG. 2E, and can be used to find an outgoing ray direction of a propagating wave within a Fresnel volume based on many incoming ray directions associated with that propagating wave.

If we assume that the incoming and outgoing waves are plane waves, i.e. $M_{1,2}(x_0)=0$, for a flat interface separating two homogeneous media, A(x, s, r) and T(x) become constants, say A and T. Then equation (7) is maximized when following condition is satisfied $$\frac{p_1(x_0)}{c_1(x_0)} \cdot (x-x_0) + \frac{p_2(x_0)}{c_2(x_0)} \cdot (x-x_0) = 0, \tag{10}$$

for any point on the interface. With the constraint $\|p_2\|^2=1$ and Eq. 10 gives us Snell's law written in terms of the tangent plane of the surface, instead of the normal of the surface.

Effective Tangent Plane, Normal, Boundary Location

Figure 2E:
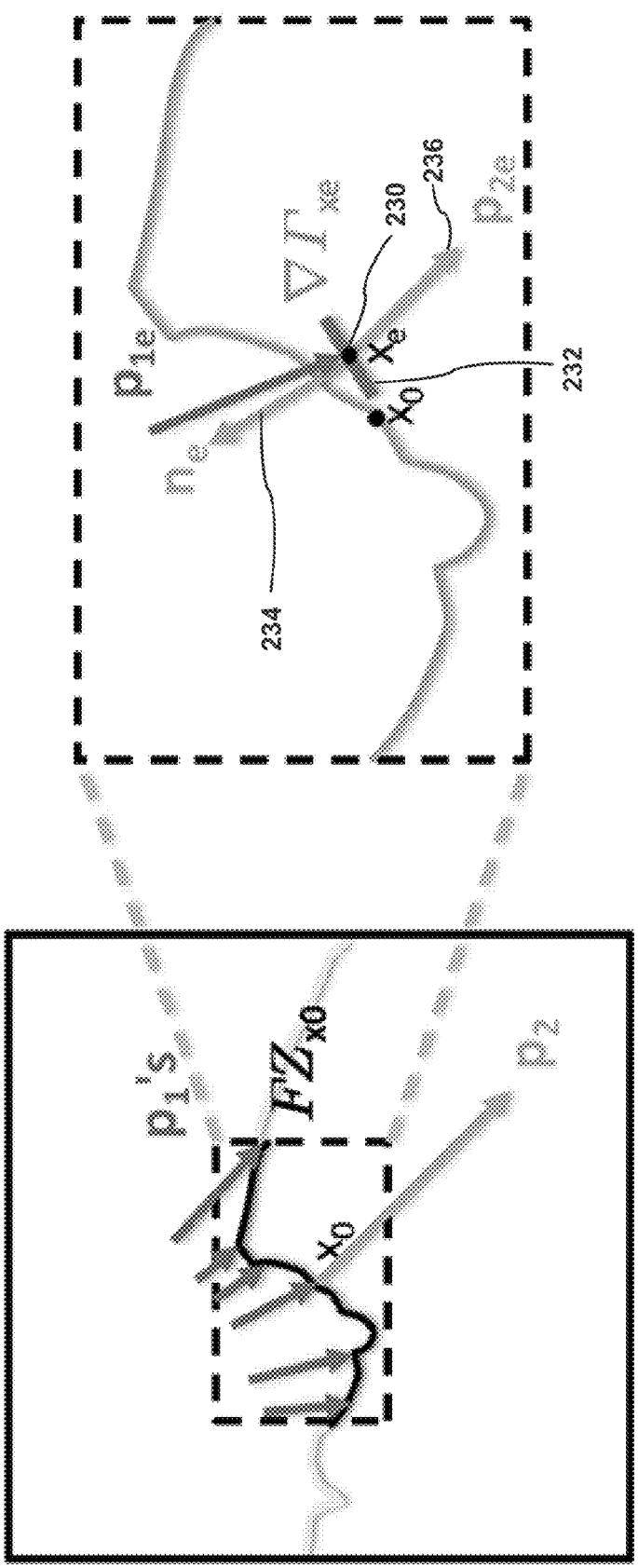

When one enhances a frequency ray tracing problem by incorporating use of a frequency-dependent Snell's law at an interface as discussed above, the frequency-dependent ray tracing problem is essentially reduced to a conventional ray tracing problem, as shown in the example of FIG. 2E.

An effective tangent plane, $\nabla\Gamma_{x_e}$, is the plane in which ray-tracing using Snell's law through this plane is equivalent to ray-tracing using frequency-dependent Snell's law in the original model. As a consequence, the effective tangent plane is dependent on frequency, incoming wavefront, and interface. In other words, we would like to find a planar surface such that when we replace the incoming wave with a plane wave, the outgoing direction obtained by maximizing Eq. (7) is equivalent to the outgoing direction obtained by Snell's law applied to the incoming direction. In this regard, we characterize the effective tangent plane by effective normal $n(x_e)$ and effective surface location $x_e$.

As illustrated in the example of FIG. 2E, let $x_e$ be a point 230 that lies on the effective tangent plane $\nabla\Gamma_{x_e}$, (232) and $n(x_e)$ be the normal 234 to the plane. Let $p_1(x_e)$ be the incoming ray direction at point $x_e$ (230) and $p_{2e}$ be the corresponding outgoing ray direction 236 that is obtained from maximization of equation Eq. (7). Then we can compute $n(x_e)$ by applying an inverse of Snell's law to $p_1$ and $p_2$. Then the effective surface location $x_e$ is defined by the point that maximizes the amplitude difference between $u(s,r,x_0)$ and $$u_e(s,r,x_0) \approx 4\int_{FZ_{x_0}} A(x,s,r)T(x)\text{sinc}(2\pi B[\Delta\tau_e(x,x_0,s,r)])dx \tag{11}$$

where

-continued $$\Delta \tau_e(x, x_0, s, r) = \left[ \frac{p_1(x_e)}{c_1(x_0)} - \frac{p_2(x_e)}{c_2(x_0)} \right] \cdot (x_e - x_0) \quad (12)$$

Figure 3A:
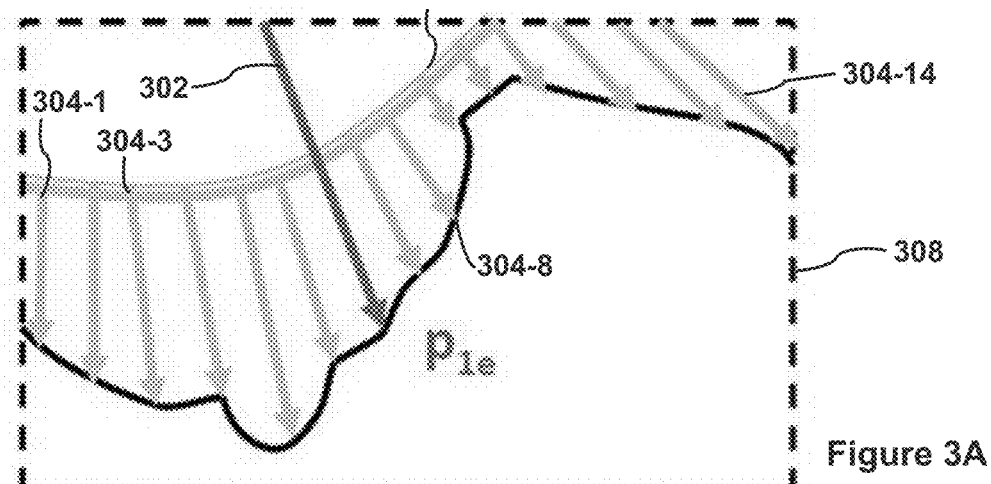
Figure 3B:
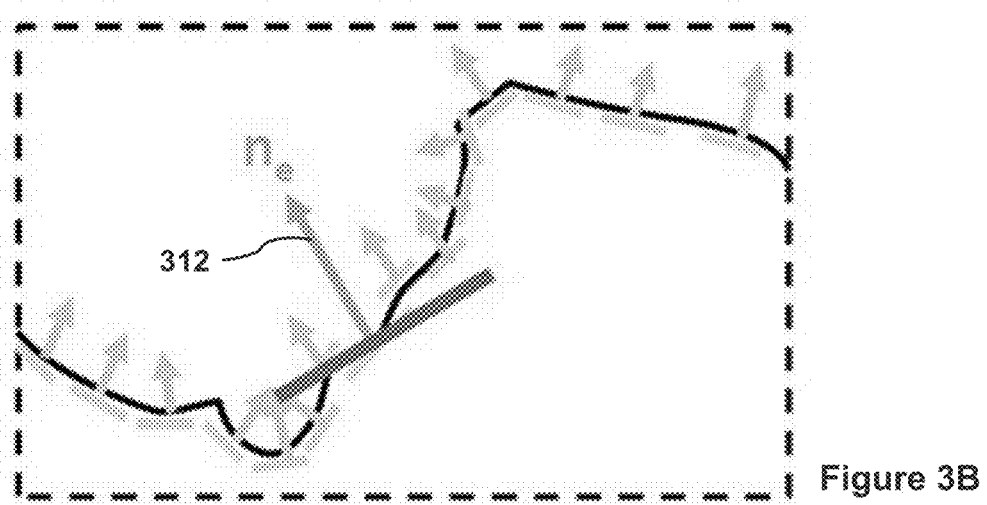
Figure 3C:
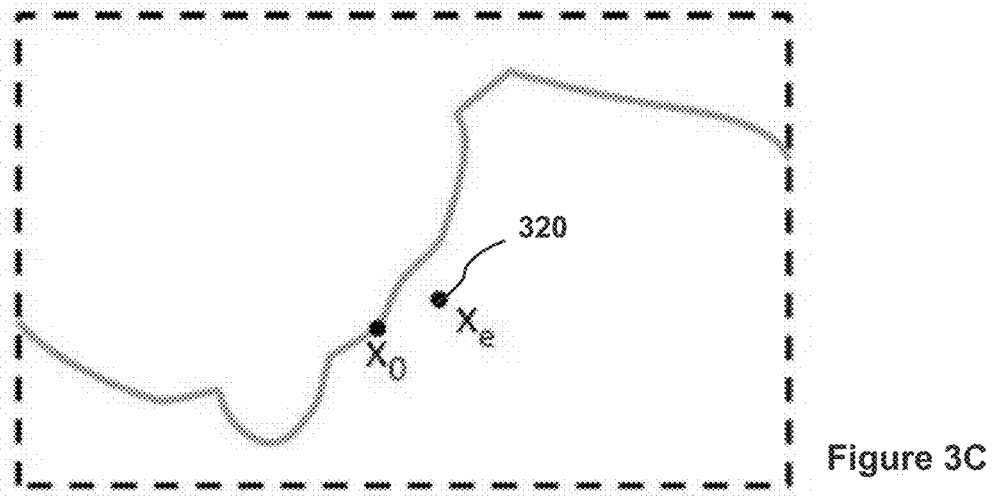

Using the Kirchhoff integral as in Eq. 11 or 7, we can find the effective surface location $x_e$, and other effective properties, including effective incoming direction, outgoing direction, and effective tangent plane. FIGS. 3A-3C illustrate an example of these effective properties and the actual rays around the interface. In FIG. 3A, the effective incoming direction $p_{1e}$ (302) is shown, which in some embodiments is a weighted average of incoming directions (304-1 through 304-14, though not all are illustrated in FIG. 3A) associated with a propagating wave 306 within Fresnel volume 308; FIG. 3B illustrates the corresponding effective normal $n_e$ (312), which in some embodiments is a weighted average of normals within the Fresnel volume; and FIG. 3C illustrates an effective boundary location $x_e$ (320), which in some embodiments is a weighted average of the boundary within the Fresnel volume. Other properties, such as outgoing direction as illustrated in FIG. 2E, can be derived using conventional ray tracing.

Fresnel Zone Based Averaging Method

Since $FZ_{x0}$ can depend on $\Delta\tau(x, x_0, s, r)$, which can depend on $p_{1,2}(x_0)$ and $M_{1,2}(x_0)$, maximization of Eq. (9) over $p_2$ can be a nonlinear process. Consequently, maximization of the amplitude of $u_e$ with respect to $x_e$ can also be nonlinear. In this regard, in the computation of $FZ_{x0}$, one way to approximate $p_2(x0)$ and $M_2(x_0)$ is by $p_1(x0)$ and $M_1(x_0)$.

In accordance with some embodiments, one may compute a suboptimal approximation to $x_e$ by first discretizing the Kirchhoff integral (or any other integrals used), then minimizing (or reducing) the difference between $u(s, r, x_0)$ and $u_e(s, r, x_0)$.

$$\Delta u(s,r;x_0) = u(s,r;x_0) - u_e(s,r;x_0) \approx 0 \quad (13)$$

Assuming that the transmission coefficient $T(x)$ is constant, the sum can be approximated by the dominant contribution of each point $x_n$ (or one or more points $x_n$ within the Fresnel zone by:

$$\sum_{x_n \in FZ_{x_0}} |w(x_n)[\Delta\tau_e(x_n, x_0, s, r) - \Delta\tau(x_n, x_0, s, r)]|^2 \approx 0 \quad (14a)$$

where $$w(x) = 4A(x, s, r)T(x)\text{sinc}'(2\pi B[\Delta\tau(x, x_0, s, r)]) \quad (14b)$$

and we compute $x_e$ by minimizing (14).
for all $x_n \in FZ_{x_0}$ where $w_n = w(x_n)$. Thus the weighted least square approximation to Eq. (14) can be given by weighted averaging of the travel times, which can effectively be approximated by weighted averaging of the surface within the Fresnel zone, i.e., $$x_e \approx \frac{\sum_{x_n \in FZ_{x_0}} w^2(x_n) x_n}{\sum_{x_n \in FZ_{x_0}} w^2(x_n)}. \quad (15)$$

Since, in some embodiments, $p_2$ is related to $p_1(x_e)$ and $n(x_e)$ via Snell's law by construction, we can rewrite the maximization problem in Eq. (9) with respect to $p_1(x_e)$ and $n(x_e)$. Similar to an average surface location, one can discretize Eq. (7) and approximate the interface at every $x_n$ with the tangent plane $\Delta\Gamma_{x_e}$ at $x_n$. Then a suboptimal weighted least-square solution to the incoming direction and the normal that solves the Snell's law at each tangent plane is given by the weighted average of incoming ray directions and surface normals, i.e., $$p_1(x_e) \approx \frac{\sum_{x_n \in FZ_{x_0}} w^2(x_n) p_1(x_n)}{\sum_{x_n \in FZ_{x_0}} w^2(x_n)} \quad (16)$$

and $$n(x_e) \approx \frac{\sum_{x_n \in FZ_{x_0}} w^2(x_n) n(x_n)}{\sum_{x_n \in FZ_{x_0}} w^2(x_n)}, \quad (17)$$

where $n(x_n)$ denotes the normal to the interface at $x_n$. Thus the effective incoming direction $p_1(x_e)$, the effective normal $n(x_e)$ and effective surface location $x_e$ are obtained, as illustrated in FIGS. 3A-3C. They can be interpreted as the weighted average of all rays within the Fresnel's zone that contributed to the outgoing ray. Ray tracing across the non-flat interface is completed.

In short, conventional ray racing methods can fail or be less effective than desired at an interface when a boundary problem is encountered. The disclosed methods and computing systems can enable a ray to transit an interface associated with the boundary problem. Before and after the interface, or outside the boundary region, conventional ray tracing can be used. Therefore, by using the methods and computing systems disclosed herein, ray tracing can now be used for many complex structures that may have proven problematic in the past.

In some embodiments, a method for frequency-dependent ray tracing for processing and imaging collected data may be summarized as follows:
  use conventional ray tracing outside the boundary region, e.g. before and/or after crossing an interface; and
  for a given frequency and/or frequency band width, and for a given incident direction, one or more effective properties are computed by means of a boundary integral.

Effective properties may include an effective boundary location, an effective normal, and one or more effective outgoing directions. They may also include one or more effective outgoing traveltimes, and an effective outgoing amplitude, which can be transmitted, reflected or converted. Effective properties can also be inhomogeneous or anisotropic. In some embodiments, a Kirchhoff-like integral can be used without scattering coefficient.

As discussed above, the computation of effective properties can be performed in at least two ways, which will be discussed in additional detail below with reference to FIGS. 4 and 5.

Attention is now directed to FIG. 4, which is a flow diagram illustrating a method 400 of processing and imaging collected data in accordance with some embodiments. Some operations in method 400 may be combined and/or the order of some operations may be changed. Further, some operations in method 400 may be combined with aspects of methods 500, 600, and 700, and/or the order of some operations in method 400 may be changed to account for incorporation of aspects of methods 500, 600, and/or 700.

As described in FIG. 4 which illustrates method 400, a boundary integral is used as a cost function for computing an effective outgoing direction. And in some embodiments, therefore, effective outgoing traveltimes and amplitudes can be established as well.

In method 400, for a given point of interest, an incoming ray direction, a carrier frequency and a bandwidth, the method includes computing (402) a Fresnel volume for a trial outgoing direction within the vicinity of a point of interest; the method also includes computing (404) the intersection of the Fresnel volume with an interface within the vicinity of a point of interest; the method includes computing (406) an approximation to a Green's function within the intersection of the Fresnel volume with the interface within the vicinity of the point of interest; the method includes computing (408) a Kirchhoff-like integral based cost function within the intersection of the Fresnel volume with the interface within the vicinity of point of interest using the approximation of the Green's function; the method includes varying (410) the trial outgoing direction until the cost function is maximized (or in some embodiments, increased above a pre-defined threshold). The trial outgoing direction that maximizes the cost function (or increases the cost function above the pre-defined threshold) is the effective outgoing direction.

In some embodiments, additional quantities/relationships can be obtained, e.g., computing an effective Snell's law by inverting effective outgoing direction(s); and computing effective reflection/transmission coefficients and a dynamic propagator matrix based on the computed effective Snell's law.

Attention is now directed to FIG. 5, which is a flow diagram illustrating a method 500 of processing and imaging collected data in accordance with some embodiments. Some operations in method 500 may be combined and/or the order of some operations may be changed. Further, some operations in method 500 may be combined with aspects of methods 400, 600, and 700 and/or the order of some operations in method 500 may be changed to account for incorporation of aspects of methods 400, 600 and/or 700.

As described in FIG. 5, which illustrates method 500, a boundary integral, including without limitation, a local averaging property, can be used to compute effective outgoing directions. And in some embodiments, therefore, effective outgoing traveltimes and amplitudes can be established as well.

In method 500, for a given point of interest, an incoming ray direction, a carrier frequency, and a bandwidth, the method includes computing (502) a Fresnel volume within the vicinity of a point of interest that is independent of outgoing direction; the method includes computing (504) the intersection of the Fresnel volume with an interface within the vicinity of the point of interest; the method includes computing (506) an approximation to a Green's function within the intersection of the Fresnel volume with the interface within the vicinity of the point of interest; the method includes using (508) the approximation of the Green's function to compute at one or more points (e.g., $x_n$) within the intersection: an incoming direction, a surface normal and a contribution to the Kirchhoff-like integral based cost function; the method includes computing for the point of interest (510): an effective incoming direction as a weighted sum of incoming direction of these points (e.g., $x_n$), an effective normal as a weighted sum of these points (e.g., $x_n$) and an effective boundary location as a weighted sum of these points (e.g., $x_n$); the method includes applying (512) Snell's law on the effective incoming direction and the effective normal to compute an effective outgoing direction; the method includes using (514) the effective boundary location to compute an effective traveltime correction.

The effective traveltime correction is to correct the traveltime due to the differences between the effective boundary location and the point of interest on the interface. In addition, other quantities, such as effective reflection/transmission coefficients and dynamic propagator matrix can be computed.

Attention is now directed to FIG. 6, which is a flow diagram illustrating a method 600 of processing and imaging collected data in accordance with some embodiments. Some operations in method 600 may be combined and/or the order of some operations may be changed. Further, some operations in method 600 may be combined with aspects of method 400, 500 and/or 700, and/or the order of some operations in method 600 may be changed to account for incorporation of aspects of method 400, 500 and/or 700.

The method 600 is performed at a computing device (e.g., computing system 100, FIG. 1), and involves performing (602) ray tracing through a sub-surface region that includes an interface.

In some embodiments, when the ray tracing is before the interface, method 600 includes performing conventional ray tracing through the sub-surface region (604).

When the ray tracing is at the interface, method 600 includes computing a frequency-dependent outgoing ray direction from a point on the interface, wherein the computation is based at least in part an incoming ray direction (or in some embodiments, one or more incoming ray directions), one or more surface normals, and a computed boundary integral (606). In some embodiments, the computed boundary integral is based at least in part on the incoming ray direction and a frequency parameter.

In some embodiments, method 600 includes using the computed boundary integral as a cost function to find the frequency-dependent outgoing ray direction (608).

In some embodiments, the computation of the frequency-dependent outgoing ray direction is also based on a travel time from an edge of the sub-surface region to the point of interest (610).

In some embodiments, the incoming ray direction is a weighted average of a plurality of incoming directions corresponding to a propagating wave (612).

In some embodiments, the computation of the frequency-dependent outgoing ray direction includes localization of a Kirchhoff integral corresponding to a region of a Fresnel volume corresponding to the vicinity of the point of interest (614).

In some embodiments, method 600 includes computing an outgoing traveltime from the point on the interface (616).

In some embodiments, method 600 includes computing an outgoing amplitude from the point on the interface (618).

In some embodiments, method 600 includes using the boundary integral to find one or more local averaging properties substantially within the vicinity of the point on the interface (620).

In some embodiments, when the ray tracing is after the interface, method 600 includes performing conventional ray tracing through the sub-surface region (622).

In some embodiments, method 600 includes forming an image of the sub-surface region based at least in part on the ray-tracing (624).

Attention is now directed to FIG. 7, which is a flow diagram illustrating a method 700 of processing and imaging collected data in accordance with some embodiments. Some operations in method 700 may be combined and/or the order of some operations may be changed. Further, some operations in method 700 may be combined with aspects of method 400, 500 and/or 600, and/or the order of some operations in method 700 may be changed to account for incorporation of aspects of method 400, 500 and/or 600.

The method 700 is performed at a computing device (e.g., computing system 100, FIG. 1), and includes computing (702) a frequency-dependent outgoing ray direction departing from a point at (or substantially at) an interface disposed in a sub-surface region, wherein the computation is based at least in part on: an incoming ray direction, one or more surface normals, and a computed boundary integral that is based at least in part on the incoming ray direction and a frequency parameter.

In some embodiments, the sub-surface region is a subterranean region with one or more geologic regions of interest (704).

In some embodiments, method 700 includes forming an image of the sub-surface region based at least in part on the frequency-dependent outgoing ray direction (706).

As those with skill in the art will understand, one or more of the steps of methods discussed above may be combined and/or the order of some operations may be changed. Further, some operations in methods may be combined with aspects of other example embodiments disclosed herein, and/or the order of some operations may be changed. It is important to recognize that geologic interpretations and imaging may be refined in an iterative fashion; this concept is applicable to the methods discussed herein. Finally, these methods may be performed by any suitable techniques, including on an automated or semi-automated basis on computing system 100 in FIG. 1.

Further, the steps in the processing methods described above may be implemented by running one or more functional modules in information processing apparatus such as general purpose processors or application specific chips, such as ASICs, FPGAs, PLDs or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A method for seismic data processing, comprising:
computing, using a computer, a wave path for a wave propagating through a sub-surface region; and
determining an outgoing ray direction for the wave at an interface in the sub-surface region using a boundary integral based at least in part on one or more frequencies of the wave and an incoming ray direction of the wave.

2. The method of claim 1, further comprising obtaining collected data corresponding to the sub-surface region, wherein computing the wave path is based at least in part on the collected data.

3. The method of claim 2, further comprising imaging the sub-surface using the outgoing ray direction to compute the wave path from the interface.

4. The method of claim 1, wherein the boundary integral is used to determine a property of the wave at the interface that is selected from the group consisting of:
an effective boundary location;
an effective normal;
an effective outgoing ray direction;
an effective outgoing traveltime; and
an effective outgoing amplitude.

5. The method of claim 1, wherein determining the outgoing ray direction comprises using a weighted average of a plurality of surface normals at the interface to determine the outgoing ray direction.

6. The method of claim 1, wherein determining the outgoing ray direction comprises using a weighted average of a plurality of incoming ray directions at the interface to determine the outgoing ray direction.

7. The method of claim 1, wherein computing the wave path comprises using ray tracing through the sub-surface region.

8. The method of claim 1, wherein the incoming ray direction is based at least in part on the computed wave path.

9. The method of claim 1, wherein the one or more frequencies correspond to a frequency bandwidth.

10. A non-transitory computer-readable medium having stored thereon a plurality of computer-executable instructions which, when executed by a computer, cause the computer to:
compute a wave path for a wave propagating through a sub-surface region;
determine an outgoing ray direction of the wave at an interface in the sub-surface region using a weighted average of a plurality of incoming ray directions and based at least in part on one or more frequencies of the wave and an incoming ray direction of the wave.

11. The non-transitory computer-readable medium of claim 10, further comprising computer-executable instructions which, when executed by the computer, cause the computer to:
obtain collected data corresponding to the sub-surface region, wherein computing the wave path is based at least in part on the collected data; and
image the sub-surface using the outgoing ray direction to compute the wave path from the interface.

12. The non-transitory computer-readable medium of claim 10, wherein the computer-executable instructions which, when executed by the computer, cause the computer to determine the outgoing ray direction comprise computer-executable instructions which cause the computer to use a boundary integral to determine the outgoing ray direction.

13. The non-transitory computer-readable medium of claim 10, wherein the computer-executable instructions which, when executed by the computer, cause the computer to determine the outgoing ray direction comprise computer-executable instructions which cause the computer to use a weighted average of a plurality of surface normals at the interface to determine the outgoing ray direction.

* * * * *